(12) United States Patent
Park et al.

(10) Patent No.: US 12,720,190 B2
(45) Date of Patent: Aug. 25, 2026

(54) CAMERA MALFUNCTION PREVENTION/REDUCTION METHOD AND ELECTRONIC DEVICE

(71) Applicant: Samsung Electronics Co., Ltd., Suwon-si (KR)

(72) Inventors: Daehee Park, Suwon-si (KR); Chonghwa Seo, Suwon-si (KR); Jongwon Lee, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 53 days.

(21) Appl. No.: 18/990,192

(22) Filed: Dec. 20, 2024

(65) Prior Publication Data

US 2025/0126355 A1 Apr. 17, 2025

Related U.S. Application Data

(63) Continuation of application No. PCT/KR2023/010137, filed on Jul. 14, 2023.

(30) Foreign Application Priority Data

Aug. 18, 2022 (KR) ........................ 10-2022-0103088
Sep. 20, 2022 (KR) ........................ 10-2022-0118738

(51) Int. Cl.
*H04N 23/65* (2023.01)
*G06T 7/80* (2017.01)

(52) U.S. Cl.
CPC ............... *H04N 23/65* (2023.01); *G06T 7/80* (2017.01)

(58) Field of Classification Search
CPC ........ H04N 23/65; H04N 17/002; H04N 5/77; G06T 7/80
See application file for complete search history.

(56) References Cited

U.S. PATENT DOCUMENTS 10,896,327 B1 * 1/2021 Lablans ................ G06V 10/25
11,295,477 B1 4/2022 Wang et al.
(Continued)

FOREIGN PATENT DOCUMENTS

CN 107277319 A 10/2017
CN 109348013 A 2/2019
(Continued)

OTHER PUBLICATIONS

International Search Report for PCT/KR2023/010137 mailed Oct. 13, 2023, 4 pages.

(Continued)

*Primary Examiner* — Shahbaz Nazrul
(74) *Attorney, Agent, or Firm* — Nixon & Vanderhye, P.C.

(57) ABSTRACT

An embodiment of the disclosure provides a method and a device configured to: in a state in which transmission power of a communication module is cut off, obtain a reference image using a camera module; store the obtained reference image in a memory; in a state in which a designated transmission power related to malfunction of the camera module is configured in the communication module, obtain a comparison image using the camera module; compare the reference image and the comparison image to determine an error in the comparison image; and determine, based on a result of the determination, the maximum transmission power of the communication module at the time of using the camera module.

19 Claims, 7 Drawing Sheets

(56) References Cited

U.S. PATENT DOCUMENTS

| | | | | |
|---|---|---|---|---|
| 2008/0002023 | A1* | 1/2008 | Cutler | G06T 3/4038 348/36 |
| 2015/0296460 | A1* | 10/2015 | Lee | H04B 1/3838 455/522 |
| 2016/0117831 | A1 | 4/2016 | Nakashima et al. | |
| 2020/0004312 | A1 | 1/2020 | Hernandez et al. | |

FOREIGN PATENT DOCUMENTS

| | | | |
|---|---|---|---|
| CN | 114422705 | A | 4/2022 |
| CN | 114727101 | A | 7/2022 |
| JP | 2006210417 | A | 8/2006 |
| JP | 2007116654 | A | 5/2007 |
| JP | 2007259199 | A | 10/2007 |
| JP | 2008211664 | A | 9/2008 |
| JP | 6458579 | B2 | 1/2019 |
| KR | 20090023635 | A | 3/2009 |

OTHER PUBLICATIONS

Written Opinion of the ISA for PCT/KR2023/010137 mailed Oct. 13, 2023, 3 pages.

* cited by examiner (410)

(450)

CAMERA MALFUNCTION PREVENTION/REDUCTION METHOD AND ELECTRONIC DEVICE

CROSS-REFERENCE TO RELATED APPLICATIONS

This application is a continuation of International Application No. PCT/KR2023/010137 designating the United States, filed on Jul. 14, 2023, in the Korean Intellectual Property Receiving Office and claiming priority to Korean Patent Application Nos. 10-2022-0103088, filed on Aug. 18, 2022, and 10-2022-0118738, filed on Sep. 20, 2022, in the Korean Intellectual Property Office, the disclosures of each of which are incorporated by reference herein in their entireties.

BACKGROUND

Field

The disclosure relates to a method and an electronic device for preventing/reducing a camera malfunction.

Description of Related Art

With the development of digital technology, various types of electronic devices such as mobile communication terminals, personal digital assistants (PDAs), electronic notebooks, smartphones, tablet personal computers (PCs), and wearable devices are being widely used. Hardware and/or software parts of these electronic devices are being continuously improved to support and enhance their functions.

A camera included in an electronic device may be affected by the wireless communication transmission power used in the electronic device. For example, if the electronic device uses high transmission power during the operation of the camera, a malfunction may occur in the camera. Therefore, in order to prevent/reduce the camera malfunction, the electronic device may have the maximum transmission power configured when operating the camera. The maximum transmission power may be configured based on the camera's log (e.g., mobile industry processor interface (MIPI) errors) or the camera's preview. Since the maximum transmission power may vary depending on the electronic device, the margin of the maximum transmission power at which the camera malfunction does not occur may be applied to the electronic device while changing the transmission power of an antenna expected to have interference.

If the maximum transmission power is applied equally to all electronic devices, the margin of the maximum transmission power may increase due to differences between the electronic devices. There may be a transmission power area that may be determined as a camera malfunction according to the camera preview even if that is not determined as a camera malfunction according to the camera log.

SUMMARY

Embodiments of the disclosure may provide a method and a device for determining the maximum transmission power when the camera is operated to prevent/reduce a camera malfunction caused by the use of the maximum transmission power when the camera is operated.

An electronic device according to an example embodiment of the disclosure may include: a camera module including a camera, a communication module comprising communication circuitry, a memory, and at least one processor, comprising processing circuitry, operatively connected to at least one of the camera module, the communication module, and/or the memory. At least one processor, individually and/or collectively, may cause the electronic device to: obtain a reference image using the camera module in a state where transmission power of the communication module is cut off, store the obtained reference image in the memory, obtain a comparison image using the camera module in a state where a designated transmission power related to malfunction of the camera module is configured in the communication module, compare the reference image with the comparison image to determine an error in the comparison image, and determine a maximum transmission power of the communication module, based on a result of the determination, based on the camera module being used.

An electronic device according to an example embodiment of the disclosure may include: a camera module, including a camera, a communication module, comprising communication circuitry, a memory, and at least one processor, comprising processing circuitry, operatively connected to at least one of the camera module, the communication module, and/or the memory. At least one processor, individually and/or collectively, may cause the electronic device to: execute a camera application, based on a request, determine whether the communication module is in a connected state with a target band, change transmission power of the communication module to a first transmission power based on the communication module being in the connected state with the target band, obtain a first reference image using the camera module at the first transmission power, increase the first transmission power to a second transmission power, obtain a comparison image using the camera module at the second transmission power, compare the obtained first reference image with the comparison image to determine an error in the comparison image, and determine, based on a result of the determination, a maximum transmission power of the communication module based on the camera module being used.

A method of operating an electronic device according to an example embodiment of the disclosure may include: obtaining a reference image using a camera module, including a camera, of the electronic device in a state where transmission power of a communication module, comprising communication circuitry, of the electronic device is cut off, storing the obtained reference image in a memory of the electronic device, obtaining a comparison image using the camera module in a state where a designated transmission power related to malfunction of the camera module is configured in the communication module, comparing the reference image with the comparison image to determine an error in the comparison image, and determining a maximum transmission power of the communication module, based on a result of the determination, based on the camera module being used.

According to an example embodiment, when the camera is driven, a camera malfunction caused using the maximum transmission power may be prevented/reduced.

According to an example embodiment, a maximum transmission power that does not cause a camera malfunction may be determined by comparing a reference image obtained in a transmission off state with a comparison image obtained while increasing the transmission power, thereby determining the camera malfunction.

According to an example embodiment, the maximum transmission power may be efficiently determined by performing an operation of determining the maximum transmission power differently by distinguishing a test process from a use process of an electronic device.

According to an example embodiment, errors that may occur when determining the maximum transmission power in the use process may be eliminated/reduced, thereby improving user convenience.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
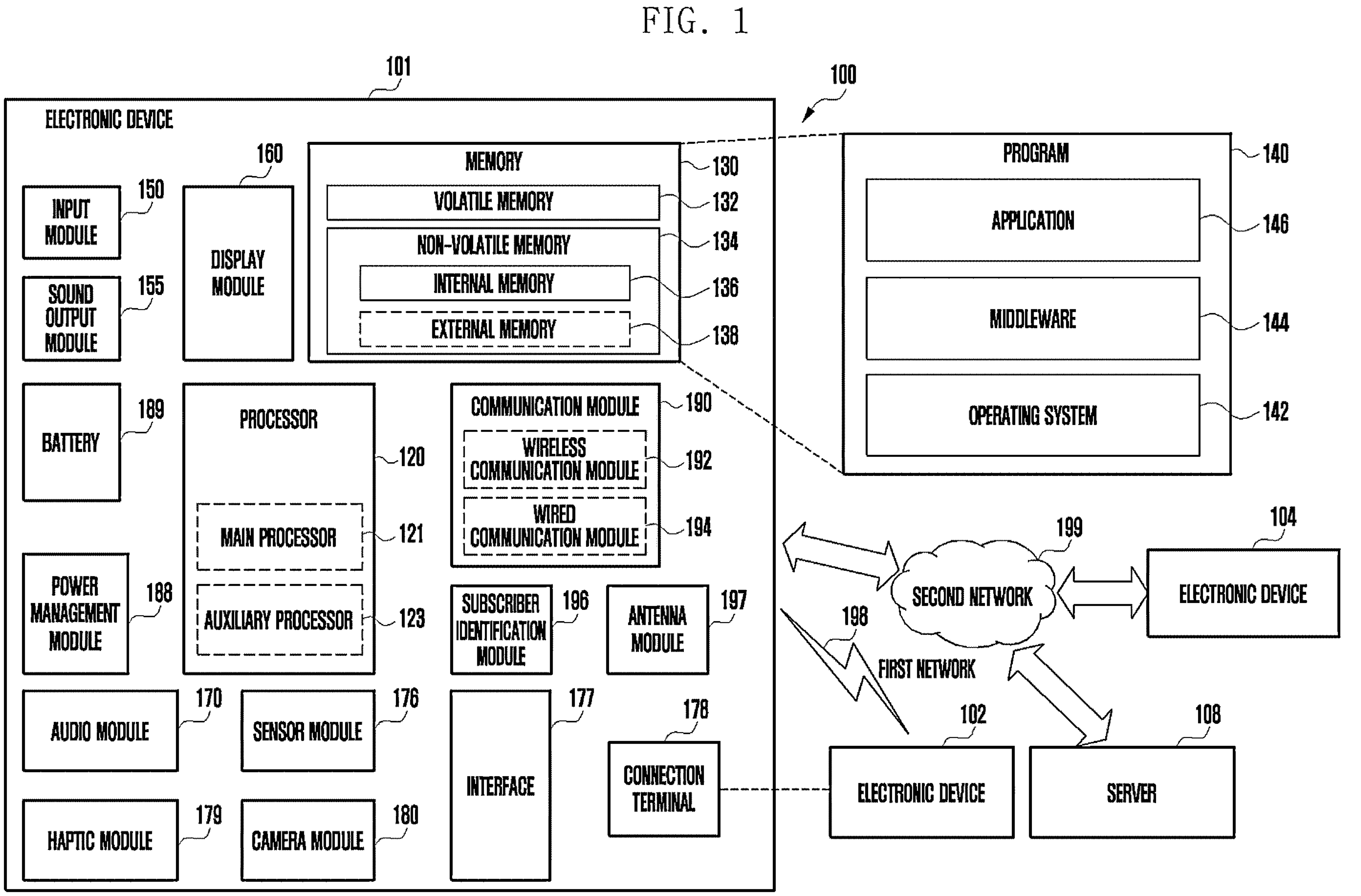
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities mat be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Figure 2:
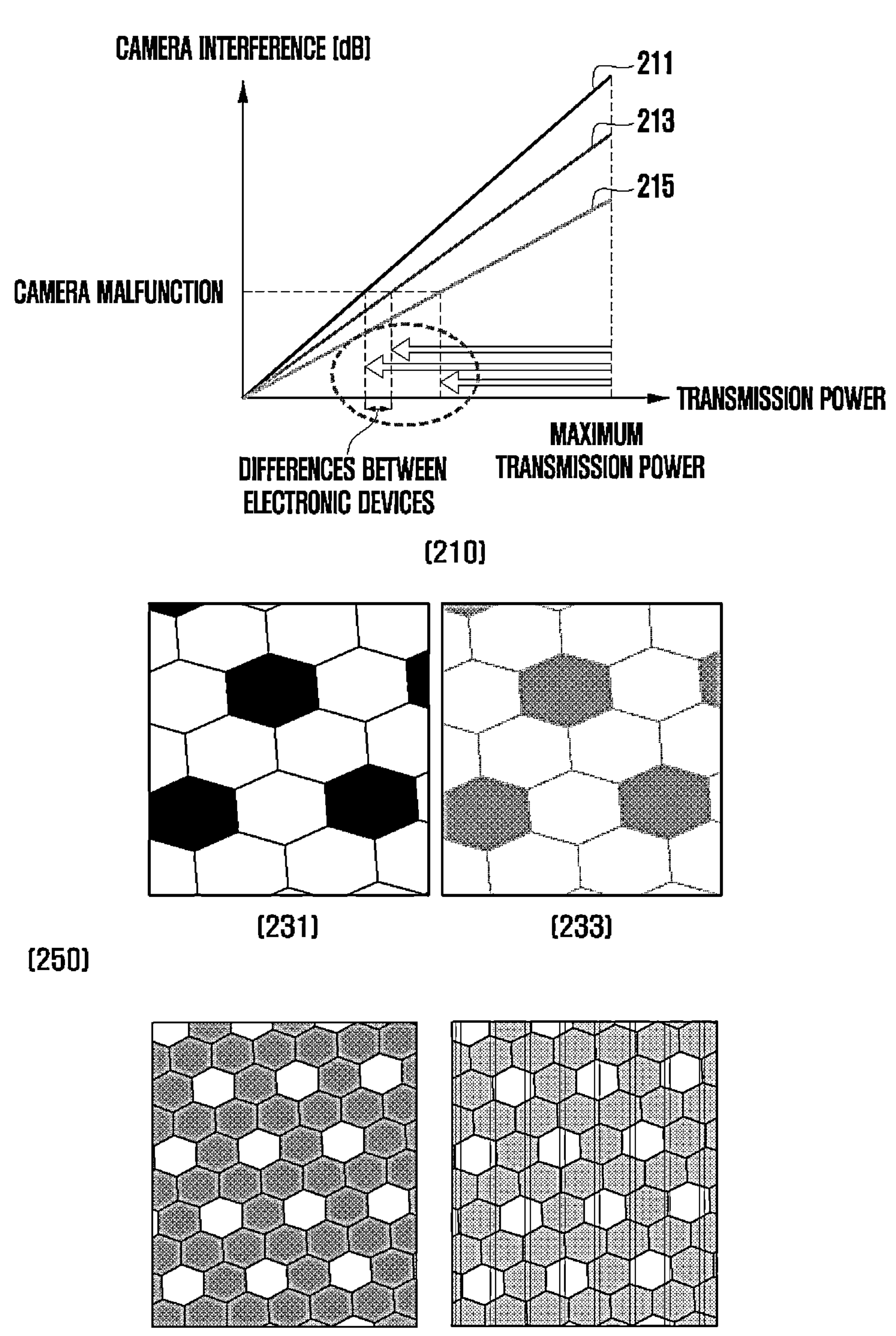
FIG. 2 is a diagram illustrating a relationship between a camera malfunction and transmission power of an electronic device according to various embodiments.

FIG. 2 is a diagram illustrating a relationship between a camera malfunction and transmission power of an electronic device according to various embodiments.

Referring to FIG. 2, the graph 210 shows the relationship between camera interference and transmission power. If high transmission power is used in the electronic device (e.g., the electronic device 101 in FIG. 1) during camera operation according to an embodiment, a camera malfunction may occur. Referring to the graph 210, it may be seen that the higher the transmission power (e.g., the transmission power of a Tx antenna) of the communication module (e.g., the communication module 190 in FIG. 1), the higher the camera interference (dB). Therefore, in order to prevent/reduce the camera malfunction, a maximum transmission power may be configured in the electronic device 101 when the camera is operated. The maximum transmission power may be configured based on camera logs (e.g., mobile industry processor interface (MIPI) errors), a camera preview, or a captured image (or video). Since the maximum transmission power may vary between the electronic devices, a margin of the maximum transmission power, which does not cause the camera malfunction, may be applied to the electronic device 101 while changing the transmission power of an antenna where camera interference is expected. For example, referring to the graph 210, it may be seen that the transmission power varies where camera interference occurs among device A 211, device B 213, and device C 215.

However, if the maximum transmission power is applied equally to all of the electronic devices 101, the margin of the maximum transmission power may increase due to the difference between the electronic devices 101. There may be a transmission power area that may be determined as a camera malfunction according to the camera preview even if that is not determined as a camera malfunction according to the camera log.

For example, referring to images 250, a first reference image 231 indicates an image in which a camera malfunction has not occurred, and a first comparison image 233 indicates a preview image (or a captured image) when a camera malfunction occurs. The first comparison image 233 indicates an image in which a camera malfunction has occurred due to incorrect camera focus, based on the camera preview, although that is not determined as a camera malfunction, based on the camera log.

A second reference image 235 is an image in which a camera malfunction has not occurred, and a second comparison image 237 indicates a preview image (or a captured image) when a camera malfunction has occurred. The second comparison image 237 indicates an image in which a camera malfunction has occurred as the vertical stripes appear in the camera preview, although it is not determined as a camera malfunction based on the camera log.

An electronic device (e.g., the electronic device 101 in FIG. 1) according to an example embodiment of the disclosure may include: a camera module including a camera (e.g., the camera module 180 in FIG. 1), a communication module comprising communication circuitry (e.g., the communication module 190 in FIG. 1), a memory (e.g., the memory 130 in FIG. 1), and at least one processor, comprising processing circuitry (e.g., the processor 120 in FIG. 1), operatively connected to at least one of the camera module, the communication module, and/or the memory. At least one processor, individually and/or collectively, may cause the electronic device to: obtain a reference image using the camera module in a state where transmission power of the communication module is cut off, store the obtained reference image in the memory, obtain a comparison image using the camera module in a state where a designated transmission power related to malfunction of the camera module is configured in the communication module, compare the reference image with the comparison image to determine an error in the comparison image, and determine a maximum transmission power of the communication module, based on a result of the determination, in a state in which the camera module is used.

At least one processor, individually and/or collectively, may be configured to execute a camera application in a transmission off state and capture a designated area through the camera application to obtain the reference image.

At least one processor, individually and/or collectively, may be configured to obtain the comparison image by increasing transmission power more than that when obtaining the reference image.

At least one processor, individually and/or collectively, may be configured to: extract a first measured value from the reference image, extract a second measured value from the comparison image, and compare the first measured value with the second measured value to determine an error in the comparison image.

The first or second measured value may be configured differently depending on a type of camera malfunction.

The comparison image may be a first comparison image, and at least one processor, individually and/or collectively, may be configured to obtain a second comparison image by increasing the transmission power more than a transmission power based on obtaining the first comparison image if no error is detected from the first comparison image.

At least one processor, individually and/or collectively, may be configured to determine a transmission power before obtaining the comparison image as the maximum transmission power based on an error being detected from the comparison image.

At least one processor, individually and/or collectively, may be configured to determine and store the maximum transmission power for each target band.

An electronic device (e.g., the electronic device 101 in FIG. 1) according to an example embodiment of the disclosure may include: a camera module including a camera (e.g., the camera module 180 in FIG. 1), a communication module comprising communication circuitry (e.g., the communication module 190 in FIG. 1), a memory (e.g., the memory 130 in FIG. 1), and at least one processor, comprising processing circuitry (e.g., the processor 120 in FIG. 1), operatively connected to at least one of the camera module, the communication module, and/or the memory. At least one processor, individually and/or collectively, may cause the electronic device to execute a camera application, based on a request, determine whether the communication module is in a connected state with a target band, change transmission power of the communication module to a first transmission power based on the communication module being in the connected state with the target band, obtain a first reference image using the camera module at the first transmission power, increase the first transmission power to a second transmission power, obtain a comparison image using the camera module at the second transmission power, compare the obtained first reference image with the comparison image to determine an error in the comparison image, and determine, based on a result of the determination, a maximum transmission power of the communication module in a state in which the camera module is used.

At least one processor, individually and/or collectively, may be configured to: change the second transmission power to the first transmission power based on an error being detected from the comparison image, obtain a second reference image using the camera module at the first transmission power, and determine whether the first reference image corresponds to the second reference image.

At least one processor, individually and/or collectively, may be configured to determine a transmission power before obtaining the comparison image as the maximum transmission power based on the first reference image corresponding to the second reference image.

The memory may store, based on the electronic device including a plurality of cameras, the maximum transmission power configured differently among the target bands depending on types of the cameras, and at least one processor, individually and/or collectively, may be configured to: switch to a second communication band based on a transmission power limit of a first communication band to which the communication module is currently connected exceeding a reference value in a state in which a first camera is used, and change the communication band to which the communication module is connected from the second communication band to the first communication band based on the camera being used being changed from the first camera to the second camera.

Figure 3:
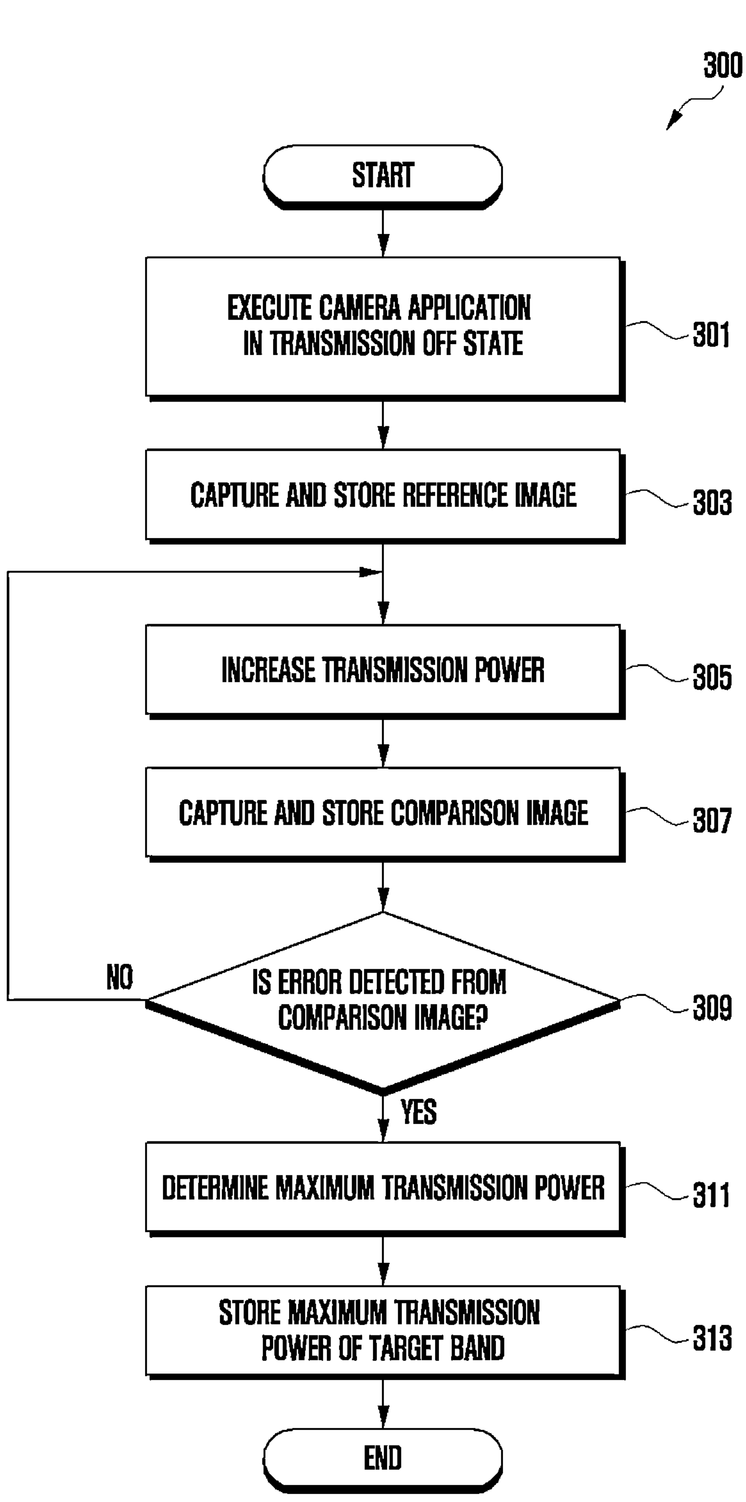
FIG. 3 is a flowchart illustrating an example method of operating an electronic device according to various embodiments.

FIG. 3 is a flowchart 300 illustrating an example method of operating an electronic device according to various embodiments. The operations in FIG. 3 may be performed in a test process by an electronic device.

Referring to FIG. 3, in operation 301, a processor (e.g., the processor 120 in FIG. 1) of an electronic device (e.g., the electronic device 101 in FIG. 1) according to an embodiment may execute a camera application in a transmission off state. The transmission off state may indicate the state in which the transmission power is 0 in a target band. For example, when a communication module (e.g., the communication module 190 in FIG. 1) uses the maximum transmission power (e.g., the maximum transmission power of a Tx antenna) when the camera is operated, there may be a frequency band in which a camera malfunction occurs. The target band may indicate a frequency band where a camera malfunction is highly likely to occur when the camera is operated. For example, when the camera is operated in a first frequency band, even if a maximum transmission power available in the first frequency band is used, a camera malfunction may not occur. When the camera is operated in a second frequency band, which is different from (e.g., lower or higher than) the first frequency band, if a maximum transmission power available in the second frequency band is used, a camera malfunction may occur. The target band may indicate the second frequency band.

In operation 303, the processor 120 may capture and store a reference image. The processor 120 may capture a reference image using a camera (e.g., the camera module 180 in FIG. 1) and store the captured reference image in a memory (e.g., the memory 130 in FIG. 1). For example, the processor 120 may capture a designated area to obtain the reference image.

In operation 305, the processor 120 may increase the transmission power. The transmission power may indicate the transmission power of the communication module (e.g., the communication module 190 in FIG. 1) (e.g., the transmission power of the Tx antenna). The transmission power may be increased from 0 by a predetermined unit (e.g., power corresponding to 1 db) or may be increased from a configured power by a predetermined unit. The processor 120 may determine a camera malfunction while gradually increasing the transmission power from 0. Alternatively, the processor 120 may use, as the configured power, the transmission power between the area where the camera malfunction occurs based on the camera logs (e.g., mobile industry processor interface (MIPI) errors) and the area where the malfunction occurs through the image (e.g., preview image and captured image) of the camera. The lower the transmission power, the lower the probability of occurrence of the camera malfunction, so the processor 120 may use a configured power at which the camera malfunction is highly likely to occur to determine the camera malfunction.

In operation 307, the processor 120 may capture and store a comparison image at the increased transmission power. For example, the processor 120 may capture a comparison image at the transmission power increased from 0 to 1, and store the captured comparison image. The processor 120 may capture a comparison image at a designated transmission power (e.g., greater than 0), and store the captured comparison image. The processor 120 may capture the designated area where the reference image was captured, and obtain the comparison image.

In operation 309, the processor 120 may determine whether an error is detected from the comparison image. The error may be a camera malfunction being detected, such as a camera out of focus or a broken image. The examples of the error are merely intended to help understanding of the disclosure, and the disclosure is not limited thereto. The processor 120 may determine whether an error is detected from the comparison image by comparing the comparison image with the reference image. For example, the processor 120 may extract a first measured value from the reference image, extract a second measured value from the comparison image, and compare the first measured value with the second measured value, thereby determining whether an error is detected from the comparison image. The first or second measured value may be configured differently depending on the type of camera malfunction or depending on the situation or condition of the electronic device 101.

For example, if the camera malfunction corresponds to camera focus, the measured value may be variance of Laplacian-filtered image (VLI), and if the camera malfunction corresponds to a broken image, the measured value may be direct difference comparison (DDC). The VLI may represent the edge ratio in the entire image after applying a filter that emphasizes the edge. The DCC may represent the average value of differences in R, G, and B between the reference image and the comparison image. The examples of the measured values are only intended to help understand the disclosure, and the disclosure is not limited thereto.

The processor 120 may return to operation 305 if no error is detected from the comparison image and perform operation 311 if an error is detected from the comparison image. When returning to operation 305 as no error is detected from the comparison image, the processor 120 may increase the transmission power by a configured unit form the previous transmission power. For example, if the processor 120 returns to operation 305 after performing operation 307 and operation 309 in the state where the transmission power was increased from 0 to 1 by performing operation 305 once when the configured unit is 1, the processor 120 may increase the transmission power from 1 to 2. The processor 120 may increase the transmission power by the configured unit each time operation 305 is performed.

If an error is detected from the comparison image, the processor 120 may determine the maximum transmission power in operation 311. For example, the processor 120 may determine the transmission power before the error is detected from the comparison image as the maximum transmission power. If an error is detected from the comparison image in the case where the configured unit is 1 and where the transmission power is increased to 4, the processor 120 may determine the transmission power (e.g., 3) before the error is detected from the comparison image as the maximum transmission power.

In operation 313, the processor 120 may store the maximum transmission power in the target band. If there is one target band, the processor 120 may perform the operation in FIG. 3 once and store the maximum transmission power for the target band in the memory 130. For example, if there are one or more target bands, the processor 120 may perform the operation in FIG. 3 for the respective target bands and store the maximum transmission powers for the respective target bands in the memory 130.

Figure 4:
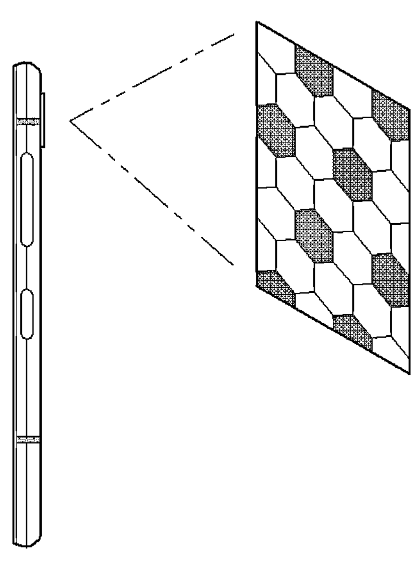
FIG. 4 is a diagram illustrating an example of determining a maximum transmission power in an electronic device according to various embodiments.
Figure 4:
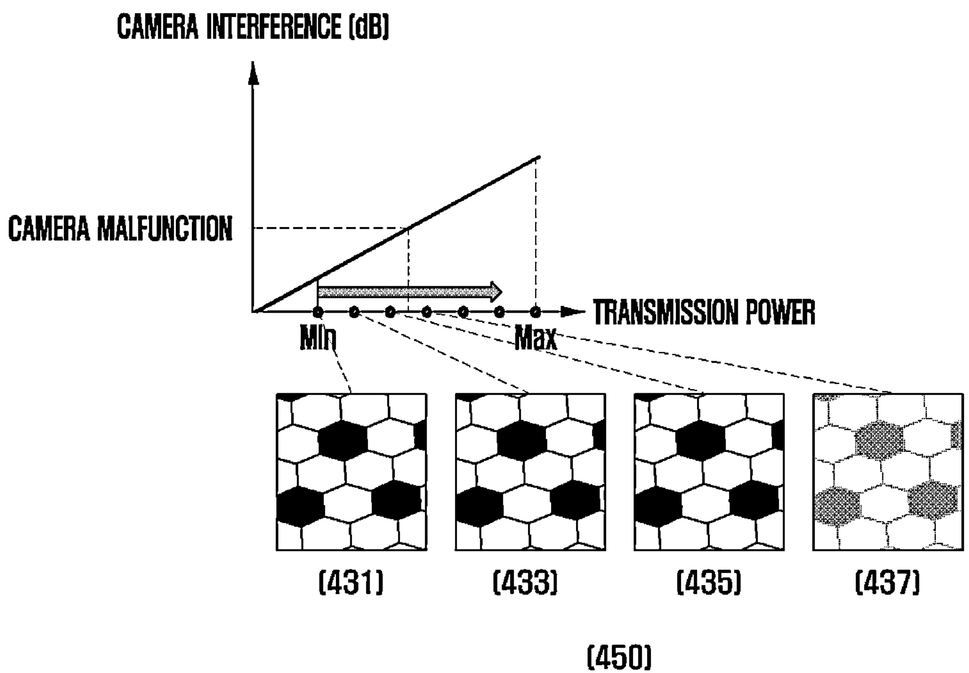

FIG. 4 is a diagram illustrating an example of determining a maximum transmission power in an electronic device according to various embodiments.

Referring to FIG. 4, a processor (e.g., the processor 120 in FIG. 1) of an electronic device (e.g., the electronic device 101 in FIG. 1) according to an embodiment may capture a designated area to obtain a reference image 410. The processor 120 may capture the reference image 410 in a transmission off state. The processor 120 may capture the designated area while increasing the transmission power to obtain comparison images 450. The processor 120 may obtain the reference image 410 and comparison images 450 by capturing the same area. The processor 120 may obtain a first comparison image 431 at the minimum transmission power and compare the reference image 410 and the first comparison image 431 to determine whether an error is detected from the first comparison image 431. For example, the processor 120 may extract a first measured value from the reference image 410, extract a second measured value from the first comparison image 431, and compare the first measured value and the second measured value, thereby determining whether an error is detected from the first comparison image 431.

If no error is detected from the first comparison image 431, the processor 120 may increase the transmission power (e.g., to 12) from the minimum transmission power (e.g., 10) by a predetermined unit (e.g., 2). The processor 120 may obtain a second comparison image 433 at the increased transmission power (e.g., 12) and compare the reference image 410 and the second comparison image 433 to determine whether an error is detected from the second comparison image 433. The processor 120 may compare a third measured value extracted from the reference image 410 and a fourth measured value extracted from the second comparison image 433 to determine whether an error is detected from the second comparison image 433. In this case, the third measured value may be the same as or different from the first measured value. In addition, the fourth measured value may be the same as or different from the second measured value. For example, the measured value may be configured differently depending on the type of camera malfunction or the situation or condition of the electronic device 101.

If no error is detected from the second comparison image 433, the processor 120 may increase the transmission power (e.g., to 14) from the previous transmission power (e.g., 12) by a predetermined unit (e.g., 2). The processor 120 may obtain a third comparison image 435 at the increased transmission power (e.g., 14) and compare the reference image 410 and the third comparison image 435 to determine whether an error is detected from the third comparison image 435. The processor 120 may compare a fifth measured value extracted from the reference image 410 and a sixth measured value extracted from the third comparison image 435 to determine whether an error is detected from the third comparison image 435. In this case, the fifth measured value may be the same as or different from the first measured value or the third measured value. In addition, the sixth measured value may be the same as or different from the second measured value or the fourth measured value. For example, the measured value may be configured differently depending on the type of camera malfunction or the situation or condition of the electronic device 101.

If no error is detected from the third comparison image 435, the processor 120 may increase the transmission power (e.g., to 16) from the previous transmission power (e.g., 14) by a configured unit (e.g., 2). The processor 120 may obtain a fourth comparison image 437 at the increased transmission power (e.g., 16) and compare the reference image 410 and the fourth comparison image 437 to determine whether an error is detected from the fourth comparison image 437. The processor 120 may compare a seventh measured value extracted from the reference image 410 with an eighth measured value extracted from the fourth comparison image 437 to determine whether an error is detected from the fourth comparison image 437. In this case, the seventh measured value may be the same as or different from at least one of the first measured value, the third measured value, or the fifth measured value. In addition, the eighth measured value may be the same as or different from at least one of the second measured value, the fourth measured value, or the sixth measured value. For example, the measured value may be configured differently depending on the type of camera malfunction or the situation or condition of the electronic device 101.

If an error is detected from the fourth comparison image 437, the processor 120 may determine the transmission power (e.g., 14) before obtaining the fourth comparison image 437 as the maximum transmission power.

Figure 5:
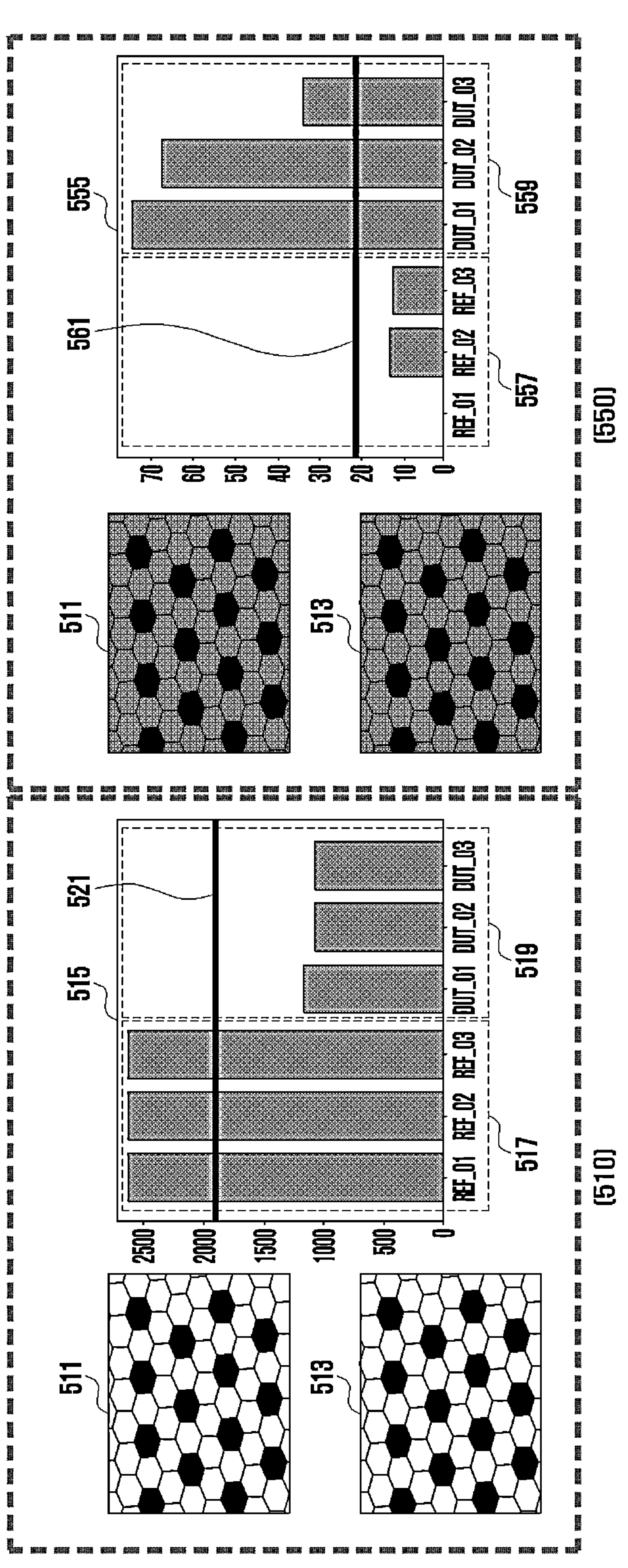
FIG. 5 is a diagram illustrating an example of detecting a camera malfunction in an electronic device according to various embodiments.

FIG. 5 is a diagram illustrating an example of detecting a camera malfunction in an electronic device according to various embodiments.

FIG. 5 may show a reference image 511, a comparison image 513, and a graph 515 comparing the reference image with measured values of the comparison image in the case of a camera focus malfunction 510. A processor (e.g., the processor 120 in FIG. 1) of an electronic device (e.g., the electronic device 101 in FIG. 1) according to an embodiment may obtain one or more reference images 517 in a transmission off state. In addition, the processor 120 may obtain one or more comparison images 519 while increasing transmission power. The processor 120 may detect an error from the comparison images 519 by comparing a first measured value extracted from the reference images 517 with a second measured value extracted from the comparison images 519. The processor 120 may determine that an error is detected from the comparison images 519 if the second measured value of the comparison images 519 does not exceed (or is not equal to or greater than) a first reference value 521 based on the first measured value extracted from the reference images 517.

A reference image 511, a comparison image 513, and a graph 555 comparing the reference image with measured values of the comparison image may be illustrated in the case of a broken image 550. The processor 120 may obtain one or more reference images 557 in the transmission off state. In addition, the processor 120 may obtain one or more comparison images 559 while increasing the transmission power. The processor 120 may detect an error in the comparison images 559 by comparing a third measured value extracted from the reference images 557 with a fourth measured value extracted from the comparison images 559. The processor 120 may determine that an error is detected from the comparison images 559 if the fourth measured value of the comparison images 559 does not exceed (or is not equal to or greater than) a second reference value 561 based on the third measured value extracted from the reference images 557.

The first measured value detected in the case of a camera focus malfunction 510 may be the same as or different from the second measured value detected in the case of a broken image 550. In addition, the second measured value detected in the case of a camera focus malfunction 510 may be the same as or different from the fourth measured value detected in the case of a broken image 550.

Figure 6A:
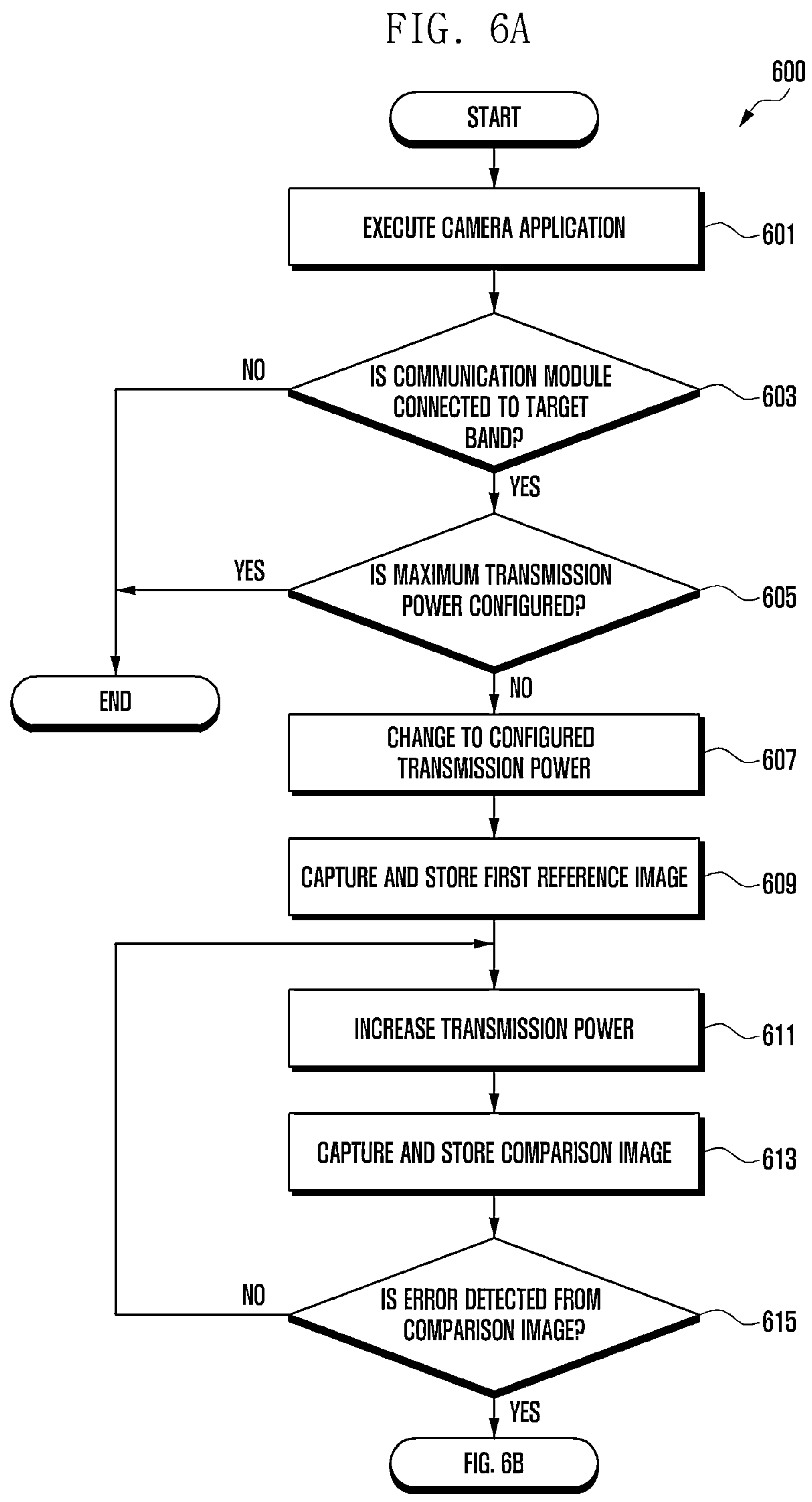
FIG. 6A and FIG. 6B are flowcharts illustrating an example method of determining a maximum transmission power in an electronic device according to various embodiments.
Figure 6B:
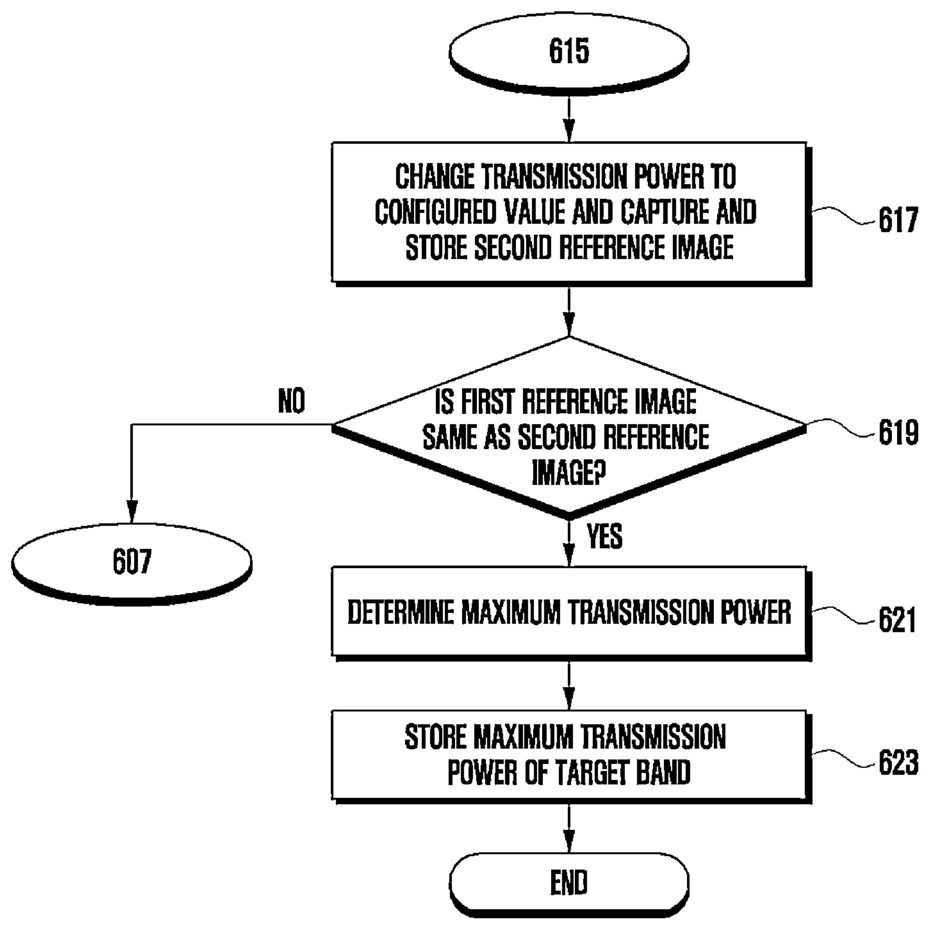

FIG. 6A and FIG. 6B are flowcharts 600 illustrating an example method of determining a maximum transmission power in an electronic device according to various embodiments. FIGS. 6A and 6B may show operations performed when a user executes a camera application on an electronic device.

Referring to FIG. 6A, in operation 601, a processor (e.g., the processor 120 in FIG. 1) of an electronic device (e.g., the electronic device 101 in FIG. 1) according to an embodiment may execute a camera application. The processor 120 may execute the camera application according to a user's request (e.g., selecting an icon of the camera application). The processor 120 may perform the operations in FIG. 6A and FIG. 6B before the user takes a picture through the camera application.

In operation 603, the processor 120 may determine whether a communication module (e.g., the communication module 190 in FIG. 1) of the electronic device 101 is connected to a target band. The target band may indicate a frequency band in which a camera malfunction is more likely to occur when the camera is operated. For example, when the camera is operated in a first frequency band, even if a maximum transmission power available in the first frequency band is used, a camera malfunction may not occur. When the camera is operated in a second frequency band, which is different from (e.g., lower or higher than) the first frequency band, if a maximum transmission power available in the second frequency band is used, a camera malfunction may occur. The target band may indicate the second frequency band.

The processor 120 may perform operation 605 if the communication module 190 is connected to the target band (e.g., in a communication state with the target band), and terminate if the communication module 190 is not connected to the target band. Since the processor 120 does not need to determine the maximum transmission power of the target band when the communication module 190 is not connected to the target band, the processor 120 may terminate without performing the following operations.

If the communication module 190 is connected to the target band, the processor 120 may determine whether the maximum transmission power is configured in the target band in operation 605. The electronic device 101 may have maximum transmission powers configured for respective target bands before being sold to the user. However, since the maximum transmission power may vary among the electronic devices 101, the maximum transmission power may not be configured for each target band.

The processor 120 may perform operation 607 if the maximum transmission power is not configured in the target band, and terminate if the maximum transmission power is configured in the target band. If the maximum transmission power is configured in the target band, the processor 120 does not need to determine the maximum transmission power of the target band, and thus terminate without performing the following operations.

If the maximum transmission power is not configured in the target band, the processor 120 may change the transmission power of the communication module 190 to a designated transmission power in operation 607. The designated transmission power may indicate the state where the transmission power is 0, or may be the transmission power between the area where the camera malfunction occurs based on the camera log and the area where the malfunction occurs through the camera image (e.g., preview image or captured image). For example, the processor 120 may change it to the designated transmission power, based on the minimum transmission power at which a camera malfunction does not occur.

In operation 609, the processor 120 may capture and store a first reference image. The processor 120 may capture a first reference image using a camera (e.g., the camera module 180 in FIG. 1) and store the captured first reference image in a memory (e.g., the memory 130 in FIG. 1).

In operation 611, the processor 120 may increase the transmission power. The transmission power may be increased from a configured power by a predetermined unit. The lower the transmission power, the lower the probability of occurrence of the camera malfunction, so the processor 120 may use a configured power at which the camera malfunction is highly likely to occur to determine the camera malfunction.

In operation 613, the processor 120 may capture and store a comparison image at the increased transmission power. For example, the processor 120 may capture a comparison image at a transmission power increased by 1 from the designated transmission power (e.g., greater than 0) and store the captured comparison image.

In operation 615, the processor 120 may determine whether an error is detected from the comparison image. The error may be a camera malfunction being detected, such as a camera out of focus or a broken image. The examples of the error are merely intended to help understanding of the disclosure, and the disclosure is not limited thereto. The processor 120 may compare the comparison image with the first reference image to determine whether an error is detected from the comparison image. For example, the processor 120 may extract a first measured value from the first reference image, extract a second measured value from the comparison image, and compare the first measured value with the second measured value to determine whether an error is detected from the comparison image. The first or second measured value may be configured differently depending on the type of camera malfunction or depending on the situation or condition of the electronic device 101.

For example, if the camera malfunction corresponds to camera focus, the measured value may be variance of Laplacian-filtered image (VLI), and if the camera malfunction corresponds to a broken image, the measured value may be direct difference comparison (DDC). The VLI may represent the edge ratio in the entire image after applying a filter that emphasizes the edge. The DCC may represent the average value of differences in R, G, and B between the reference image and the comparison image. The examples of the measured values are only intended to help understand the invention, and the disclosure is not limited thereto.

The processor 120 may return to operation 611 if no error is detected from the comparison image, and may perform FIG. 6B (e.g., operation 617) if an error is detected from the comparison image. When returning to operation 611 as no error is detected from the comparison image, the processor 120 may increase the transmission power by a configured unit form the previous transmission power. For example, if the processor 120 returns to operation 611 after performing operation 613 and operation 615 in the state where the transmission power was increased from 1 to 2 by performing operation 611 once when the configured unit is 1, the processor 120 may increase the transmission power from 2 to 3. The processor 120 may increase the transmission power by the configured unit each time operation 611 is performed.

If an error is detected from the above comparison image, the processor 120 may change the transmission power to a configured value, and may capture and store a second reference image in operation 617. FIGS. 6A and 6B may be performed in a situation where the user is not aware of the situation before the user takes a picture (or video) with the camera. The subject and the shooting environment may change very quickly, so the reliability of the measured values extracted from the reference image or the comparison image may be lowered. To address this problem, the operation of obtaining the reference image may be performed once or more. For example, if an error is detected from the comparison image after capturing the first reference image, the processor 120 may capture the reference image once more (e.g., obtain the second reference image). Through this, it is possible to determine that the same (or similar) photo was captured while a camera malfunction determination algorithm (e.g., FIGS. 6A and 6B) is being performed, and to increase the reliability of the measured values.

The processor 120 may change the transmission power (e.g., the current transmission power) to a configured value in order to obtain a second reference image without a camera malfunction. The configured value may be the same as or similar to the designated transmission power in operation 607. When performing operations 611 to 615, the transmission power increases, compared to the designated transmission power, in operation 607, so the processor 120 may change the current transmission power to the configured value in order to obtain the second reference image.

In operation 619, the processor 120 may determine whether the first reference image corresponds to the second reference image. The processor 120 may perform operation 621 if the first reference image corresponds to (e.g., is the same as) the second reference image, and may return to operation 607 if the first reference image does not correspond to the second reference image. If the measured values of the first reference image and the second reference image are different, the processor may determine that the reliability of performing operations 609 to 615 is low and re-measure the reference image. If the first reference image does not correspond to the second reference image, the processor 120 may return to operation 607 to capture the first reference image and store the captured first reference image.

If the first reference image corresponds to the second reference image, the processor 120 may determine the maximum transmission power in operation 621. For example, the processor 120 may determine the transmission power before an error is detected from the comparison image as the maximum transmission power. If an error is detected from the comparison image in the case where the predetermined unit is 1 and where the transmission power is increased to 4, the processor 120 may determine the transmission power (e.g., 3) before the error is detected from the comparison image as the maximum transmission power.

In operation 623, the processor 120 may store the maximum transmission power of the target band. The processor 120 may store, in the memory 130, the maximum transmission power for the connected target band when the camera is operated.

According to an embodiment, the camera module 180 included in the electronic device 101 may be one or more. For example, the camera module 180 may include one camera (e.g., normal) on the front face of the electronic device 101 and at least two cameras (e.g., wide/long, etc.) on the back face of the electronic device 101. The cameras may have different performances or types. The electronic device 101 may configure the transmission power differently among the respective target bands depending on the type of the camera. For example, if the maximum transmission power is stored in the process step of the electronic device 101, and if the transmission power limit in the currently connected communication band (e.g., a first communication band) exceeds a reference value when the electronic device 101 uses a long camera (e.g., a rear camera), the electronic device 101 may switch to another communication band (e.g., a second communication band). When the type of camera used is changed (e.g., change from a rear camera to a front camera), the electronic device 101 may also switch the communication band (e.g., change from a second communication band to a first communication band) to connect to the communication band having the largest margin of transmission power.

A method of operating an electronic device according to an example embodiment of the disclosure may include: obtaining a reference image using a camera module including a camera of the electronic device in a state where transmission power of a communication module comprising communication circuitry of the electronic device is cut off, storing the obtained reference image in a memory of the electronic device, obtaining a comparison image using the camera module in a state where a designated transmission power related to malfunction of the camera module is configured in the communication module, comparing the reference image with the comparison image to determine an error in the comparison image, and determining a maximum transmission power of the communication module, based on a result of the determination, in a state in which the camera module is used.

The obtaining of the comparison image may include obtaining the comparison image by increasing transmission power more than that when obtaining the reference image.

The method may include extracting a first measured value from the reference image, extracting a second measured value from the comparison image, and comparing the first measured value with the second measured value to determine an error in the comparison image.

The first or second measured value may be configured differently depending on a type of camera malfunction.

The comparison image may be a first comparison image, and the method may further include obtaining a second comparison image by increasing the transmission power more than a transmission power when obtaining the first comparison image based on no error being detected from the first comparison image.

The determining of the maximum transmission power may include determining a transmission power before obtaining the comparison image as the maximum transmission power based on an error being detected from the comparison image.

The determining of the maximum transmission power may include determining and storing the maximum transmission power for each target band.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be use in conjunction with any other embodiment(s) described herein.

What is claimed is:

1. An electronic device comprising:

a camera module including a camera;

a communication module comprising communication circuitry;

memory storing instructions; and at least one processor, comprising processing circuitry, operatively connected to at least one of the camera module, the communication module, and/or the memory, wherein the instructions, the at least one processor, individually and/or collectively, cause the electronic device to:

obtain a reference image using the camera module in a state where transmission power of the communication module is cut off;

store the obtained reference image in the memory;

obtain a comparison image using the camera module in a state where a designated transmission power related to malfunction of the camera module is configured in the communication module;

compare the reference image with the comparison image to determine an error in the comparison image; and determine, based on a result of the determination, a maximum transmission power of the communication module in a state in which the camera module is used.

2. The electronic device of claim 1, wherein the instructions, when executed by the at least one processor, individually and/or collectively, cause the electronic device to:

execute a camera application in a transmission off state; and capture a designated area through the camera application to obtain the reference image.

3. The electronic device of claim 1, wherein the instructions, when executed by the at least one processor, individually and/or collectively, cause the electronic device to:

obtain the comparison image by increasing transmission power more than that when obtaining the reference image.

4. The electronic device of claim 1, wherein the instructions, when executed by the at least one processor, individually and/or collectively, cause the electronic device to:

extract a first measured value from the reference image;

extract a second measured value from the comparison image; and compare the first measured value with the second measured value to determine an error in the comparison image.

5. The electronic device of claim 4, wherein the first or second measured value is configured differently based on a type of camera malfunction.

6. The electronic device of claim 1, wherein the comparison image is a first comparison image, and wherein the instructions, when executed by the at least one processor, individually and/or collectively, cause the electronic device to:

obtain a second comparison image by increasing the transmission power more than a transmission power when obtaining the first comparison image based on no error being detected from the first comparison image.

7. The electronic device of claim 1, wherein the instructions, when executed by the at least one processor, individually and/or collectively, cause the electronic device to:

determine a transmission power before obtaining the comparison image as the maximum transmission power based on an error being detected from the comparison image.

8. The electronic device of claim 1, wherein the instructions, when executed by the at least one processor, individually and/or collectively, cause the electronic device to:

determine and store the maximum transmission power for each target band.

9. An electronic device comprising:

a camera module including a camera;

a communication module comprising communication circuitry, a memory, and at least one processor, comprising processing circuitry, operatively connected to at least one of the camera module, the communication module, and/or the memory, wherein the ins at least one processor, individually and/or collectively, cause the electronic device to:

execute a camera application, based on a request;

determine whether the communication module is in a connected state with a target band;

change transmission power of the communication module to a first transmission power based on the communication module being in the connected state with the target band;

obtain a first reference image using the camera module at the first transmission power;

increase the first transmission power to a second transmission power;

obtain a comparison image using the camera module at the second transmission power;

compare the obtained first reference image with the comparison image to determine an error in the comparison image; and determine, based on a result of the determination, a maximum transmission power of the communication module in a state in which the camera module is used.

10. The electronic device of claim 9, wherein the instructions, when executed by the at least one processor, individually and/or collectively, cause the electronic device to:

change the second transmission power to the first transmission power based on an error being detected from the comparison image;

obtain a second reference image using the camera module at the first transmission power; and determine whether the first reference image corresponds to the second reference image.

11. The electronic device of claim 10, wherein the instructions, when executed by the at least one processor, individually and/or collectively, cause the electronic device to:

determine a transmission power before obtaining the comparison image as the maximum transmission power based on the first reference image corresponding to the second reference image.

12. The electronic device of claim 9, wherein the instructions, when executed by the at least one processor, individually and/or collectively, cause the electronic device to:

store, in the memory, based on the electronic device comprising a plurality of cameras, the maximum transmission power configured differently among the target bands depending on types of the cameras;

switch to a second communication band based on a transmission power limit of a first communication band to which the communication module is currently connected exceeding a reference value in a state in which a first camera is used; and change the communication band to which the communication module is connected from the second communication band to the first communication band based on the camera being used being changed from the first camera to the second camera.

13. A method of operating an electronic device, the method comprising:

obtaining a reference image using a camera module including a camera of the electronic device in a state where transmission power of a communication module comprising communication circuitry of the electronic device is cut off, storing the obtained reference image in a memory of the electronic device, obtaining a comparison image using the camera module in a state where a designated transmission power related to malfunction of the camera module is configured in the communication module, comparing the reference image with the comparison image to determine an error in the comparison image, and determining a maximum transmission power of the communication module, based on a result of the determination, in a state in which the camera module is used.

14. The method of claim 13, wherein the obtaining of the comparison image comprises obtaining the comparison image by increasing transmission power more than that when obtaining the reference image.

15. The method of claim 13, further comprising:

extracting a first measured value from the reference image, extracting a second measured value from the comparison image, and comparing the first measured value with the second measured value to determine an error in the comparison image.

16. The method of claim 15, wherein the first or second measured value is configured differently depending on a type of camera malfunction.

17. The method of claim 13, wherein the comparison image is a first comparison image, and the method further comprising: obtaining a second comparison image by increasing the transmission power more than a transmission power when obtaining the first comparison image based on no error being detected from the first comparison image.

18. The method of claim 13, wherein the determining of the maximum transmission power comprise determining a transmission power before obtaining the comparison image as the maximum transmission power based on an error being detected from the comparison image.

19. The method of claim 13, wherein the determining of the maximum transmission power comprises determining and storing the maximum transmission power for each target band.

* * * * *